J. R. GAMMETER.
PIPE COUPLING.
APPLICATION FILED FEB. 8, 1918.
1,275,149.
Patented Aug. 6, 1918.
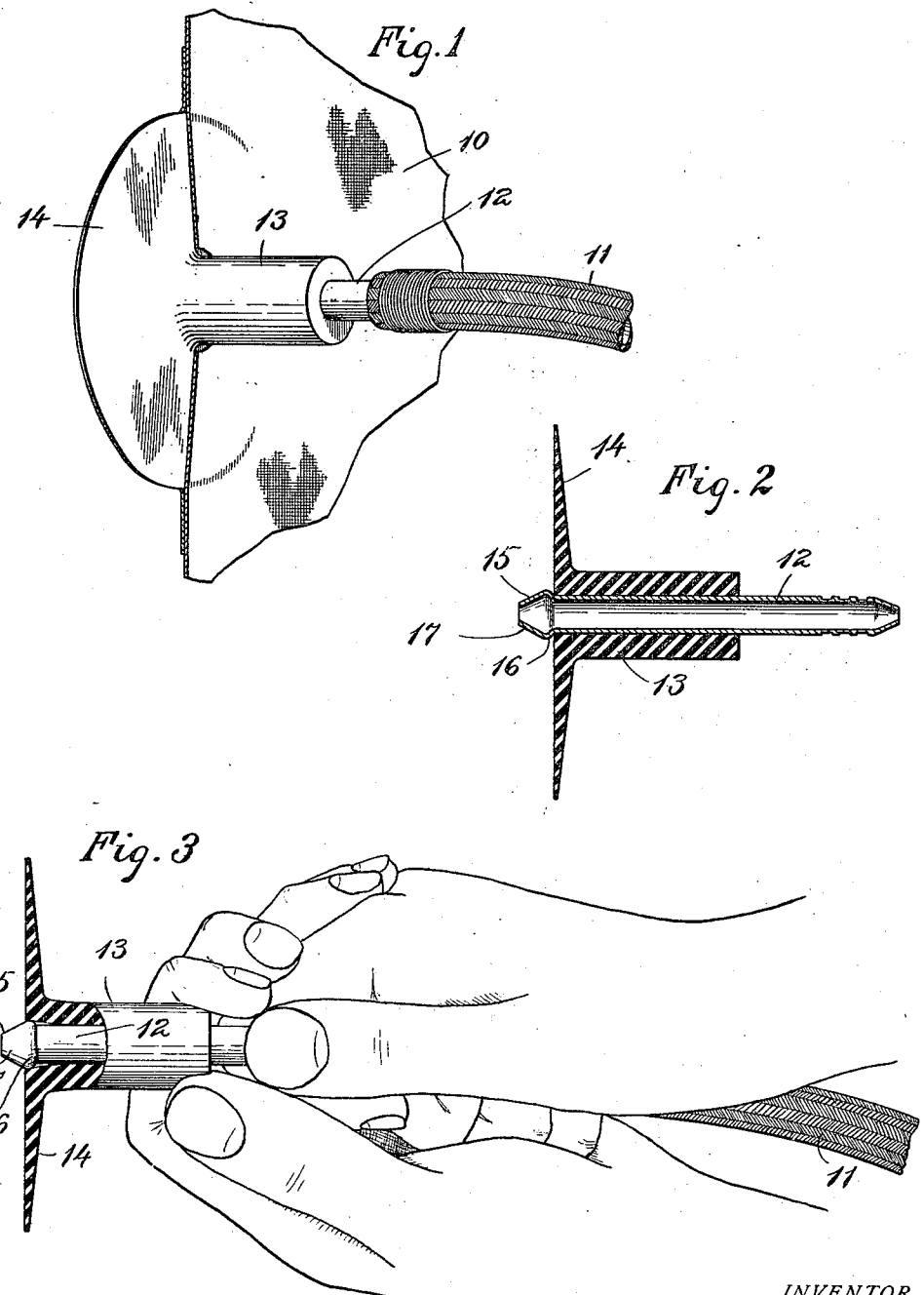
INVENTOR.
John R. Gammeter
BY
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

PIPE-COUPLING.

1,275,149.　　　　Specification of Letters Patent.　　Patented Aug. 6, 1918.

Application filed February 8, 1918. Serial No. 215,962.

*To all whom it may concern:*

Be it known that I, JOHN R. GAMMETER, a citizen of the United States, residing at Akron, in the county of Summit and State of Ohio, have invented certain new and useful Improvements in Pipe-Couplings, of which the following is a specification.

The object of this invention is to provide a form of fluid-tight coupling for two sections of a conduit, or a conduit and a fluid receptacle, the members whereof are adapted to be readily connected and disconnected by hand, but when coupled will resist an effort to separate them by an ordinary pulling strain exerted on either member. Such a coupling is useful, for example, as a means for connecting a manometer tube to the gas-bag of a balloon.

Of the accompanying drawings,

Figure 1 is a broken perspective view of a coupling embodying my invention.

Fig. 2 is a longitudinal section.

Fig. 3 is a side elevation, partly in section, showing the mode of disconnecting the coupling members.

In the drawings, 10 may represent the wall of a receptacle such as a balloon bag, 11 is a flexible pipe or conduit such as a manometer tube, and 12 is a metallic pipe-section or nipple constituting one of the members of a coupling whose other member is an elastic sleeve 13 having a mushroom flange 14 whereby it is attached to the balloon wall 10. The sleeve and its flange are composed of vulcanized rubber of the grade known as "pure gum," and the walls of its aperture normally embrace the member 12 with a tight fit, but said sleeve is without any fabric or other reinforcement capable of preventing the enlargement of said aperture. Member 12 is formed at its forward or inner end with an enlarged head 15, said head having a rounded shoulder 16, which overlies and abuts against the inner end of the rubber sleeve, and a tapered or frusto-conical nose 17.

The members of the coupling being separated, they may be connected by forcing the head 15 of member 12 through the aperture of sleeve 13 until it emerges at the inner end as indicated in Fig. 2, member 12 being preferably lubricated by wetting it to decrease the friction. The two coupling members then form a substantially fluid-tight joint which cannot be broken either by the internal pressure which the receptacle 10 is designed to carry, or by any ordinary pulling strain exerted upon the tube 11. To disconnect the coupling, the operator grasps the tube and member 12 in one hand, and with the other hand grasping the outer end of sleeve 12, he pushes said sleeve in the direction of head 15. This pressure tends to shorten the sleeve and increase the diameter of its aperture by reaction against the head 15, so that said head may be started into the aperture as indicated in Fig. 3, whereupon the member 12 is readily drawn out of sleeve 13 by a continuation of the pressure upon the latter.

I claim:

1. A pipe coupling comprising a rigid pipe section having a head at its inner end, and an elastic rubber sleeve tightly surrounding the stem of said section and abutting against its head, the normal aperture of the sleeve being slightly smaller than the head, and the sleeve being exposed for manual engagement and adapted to be shortened by endwise pressure thereon in the direction of said head, whereby the aperture is enlarged and the head drawn out therethrough to disconnect the coupling.

2. A pipe coupling comprising an elastic rubber sleeve formed at one end with a mushroom flange for connecting it to the wall of a fluid receptacle, its other end being exposed for manual engagement, and a rigid pipe section having a stem tightly fitted in the sleeve and a head on its inner end, said head being formed with a rounded shoulder which abuts against the inner end of the sleeve, and a tapered nose.

In testimony whereof I have hereunto set my hand this 4 day of February 1918.

JOHN R. GAMMETER.

Copies of this patent may be obtained for five cents each, by addressing the "Commissioner of Patents. Washington, D. C."